US011940134B2

(12) United States Patent
Sui et al.

(10) Patent No.: US 11,940,134 B2
(45) Date of Patent: Mar. 26, 2024

(54) LIGHTING LAMP WITH EXPLANDABLE AND CONTRACTABLE DAMPER

(71) Applicants: SUZHOU OPPLE LIGHTING CO., LTD., Suzhou (CN); OPPLE LIGHTING CO., LTD., Shanghai (CN)

(72) Inventors: Zhonghua Sui, Suzhou (CN); Yueping Wang, Suzhou (CN); Yuejun Feng, Suzhou (CN)

(73) Assignees: SUZHOU OPPLE LIGHTING CO., LTD., Suzhou (CN); OPPLE LIGHTING CO., LTD., Shanghai (CN)

(*) Notice: Subject to any disclaimer, the term of this patent is extended or adjusted under 35 U.S.C. 154(b) by 0 days.

(21) Appl. No.: 17/836,975

(22) Filed: Jun. 9, 2022

(65) Prior Publication Data

US 2022/0299196 A1 Sep. 22, 2022

Related U.S. Application Data

(63) Continuation of application No. PCT/CN2020/135298, filed on Dec. 10, 2020.

(51) Int. Cl.
*F21V 21/26* (2006.01)

(52) U.S. Cl.
CPC .................................... *F21V 21/26* (2013.01)

(58) Field of Classification Search
CPC .......... F21V 21/26; F21V 21/22; F21V 21/28; F21S 6/00; F21S 6/003; F21S 6/002
See application file for complete search history.

(56) References Cited

U.S. PATENT DOCUMENTS

| | | | | |
|---|---|---|---|---|
| 2009/0190365 | A1* | 7/2009 | Kauffman | F16L 27/0841 362/418 |
| 2009/0236481 | A1 | 9/2009 | Chen | |
| 2016/0290377 | A1* | 10/2016 | Ng | F21S 6/002 |
| 2018/0224101 | A1* | 8/2018 | Qiu | F21V 21/06 |
| 2020/0332986 | A1* | 10/2020 | Xia | F21V 17/005 |

FOREIGN PATENT DOCUMENTS

| | | |
|---|---|---|
| CN | 204664987 U | 9/2015 |
| CN | 204962430 U | 1/2016 |
| CN | 207394496 U | 5/2018 |
| CN | 208670762 U | 3/2019 |
| CN | 209101075 U | 7/2019 |
| CN | 211146182 U | 7/2020 |

OTHER PUBLICATIONS

International Search Report of PCT Application No. PCT/CN2020/135298 dated Feb. 26, 2021 with English translation, (6p).

* cited by examiner

*Primary Examiner* — Tracie Y Green
(74) *Attorney, Agent, or Firm* — Arch & Lake LLP

(57) ABSTRACT

The present disclosure provides a lighting lamp, which includes a lamp cap and a connecting rod assembly, the connecting rod assembly includes a first connecting rod, a second connecting rod and a damper; a first end of the second connecting rod is rotatably connected with a first end of the first connecting rod; a first end of the damper is connected with the first connecting rod, a second end of the damper is connected with the second connecting rod, and the lamp cap is connected with the first connecting rod.

12 Claims, 6 Drawing Sheets

LIGHTING LAMP WITH EXPLANDABLE AND CONTRACTABLE DAMPER

CROSS REFERENCE TO RELATED APPLICATIONS

This application is based upon and claims the priority of PCT patent application No. PCT/CN2020/135298 filed on Dec. 10, 2020, which claims priority to Chinese Patent Application No. CN201922227762.6 filed on Dec. 10, 2019, the entire contents of both of which are hereby incorporated by reference herein for all purposes.

TECHNICAL FIELD

The present disclosure relates to the technical field of lighting equipment, and in particular, to a lighting lamp.

BACKGROUND

Lamps refer to appliances that can transmit light and can distribute and change the light distribution of the light source. The lamps include all the components needed to fix and protect the light source except the light source, as well as wiring accessories necessary for connection with the power source. The lamps mainly include table lamps, wall lamps, etc.

SUMMARY examples of the present disclosure provides a lighting lamp, including a lamp cap and a connecting rod assembly. The connecting rod assembly includes a first connecting rod, a second connecting rod and a damper; a first end of the second connecting rod is rotatably connected with a first end of the first connecting rod; the damper includes a fixed end and a movable end, the movable end is slidably connected with the fixed end, and damping force is provided between the movable end and the fixed end; the fixed end is connected with one of the first connecting rod and the second connecting rod, and the movable end is connected with the other one of the first connecting rod and the second connecting rod; the lamp cap is connected with the first connecting rod.

BRIEF DESCRIPTION OF THE DRAWINGS

The drawings described here are used to provide a further understanding of the present disclosure and constitute a part of the present disclosure. The examples and their descriptions are used to explain the present disclosure and do not constitute an improper limitation of the present disclosure. In the drawings.

DETAILED DESCRIPTION

Figure 1:
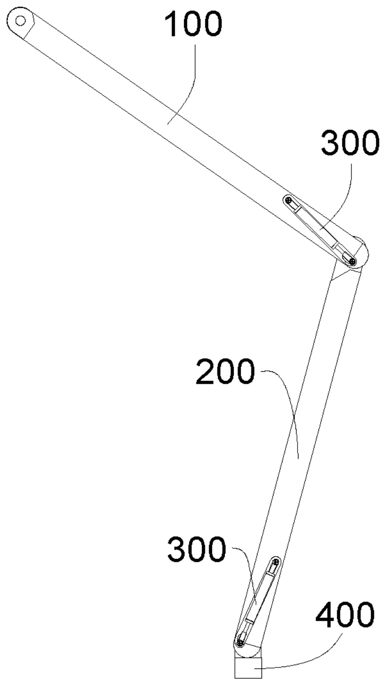
FIG. 1 is a front view of a connecting rod assembly disclosed in examples of the present disclosure.

Examples of the present disclosure will be described below in combination with the accompanying drawings of the present disclosure. Apparently, the described examples are merely a part rather than all the examples of the present disclosure. All other examples that are derived from the examples of the present disclosure by an ordinary skilled in the art without creative efforts shall fall within the protection scope of the present disclosure. The reference numerals in the accompanying drawings are merely used to distinguish different steps in technical solutions from each other, rather than delimiting execution orders of the steps. The specific execution order may be referred to the description in the present disclosure.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

Table lamps are generally used for lighting in office or study places, such as reading, writing, design, review, etc. For people who do desktop work, ensuring a good visual environment in the work area is of great benefit to improving the quality of study and office, improving work efficiency and protecting physical health. The brightness and uniformity of the light should match the brightness and darkness of the surrounding environment, and the brightness of the light and the brightness of the environment should not be too different. The relationship between brightness and uniformity of the light may be balanced by rotation adjusting the height of the light source and the direction of the light source, so as to avoid eye fatigue and create a comfortable and healthy light environment.

Current lamps mainly use latch rotation shafts, disc-shaped rotation shafts or gooseneck hoses as rotating structural members. These rotating structural members generally have disadvantages such as unstable performance, short life and poor hand feeling.

Description of reference numerals: 10—connecting rod assembly; 100—first connecting rod; 110—first arc-shaped groove; 120—first installation groove; 200—second connecting rod; 210—first block; 220—second arc-shaped groove; 230—second installation groove; 300—damper; 310—fixed end; 320—movable end; 400—third connecting rod; 410—second block; 500—wire hole; 20—lamp cap; 21—connecting portion; 22—light source; 30—connecting base; 40—power source; 50—wire.

Figure 2:
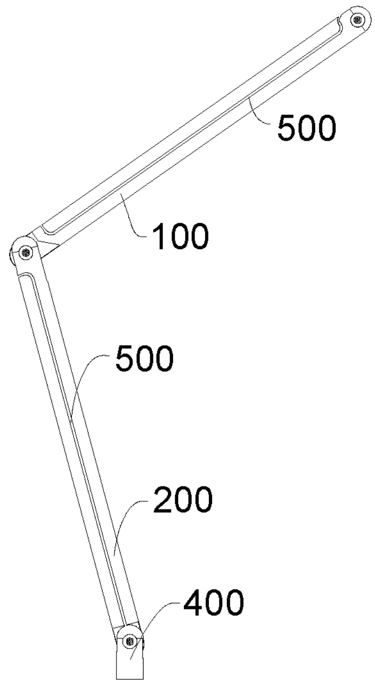
FIG. 2 is a rear view of the connecting rod assembly disclosed in the examples of the present disclosure.
Figure 3:
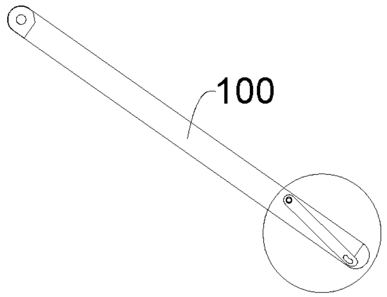
FIG. 3 is a schematic diagram of a first connecting rod disclosed in the examples of the present disclosure.
Figure 4:
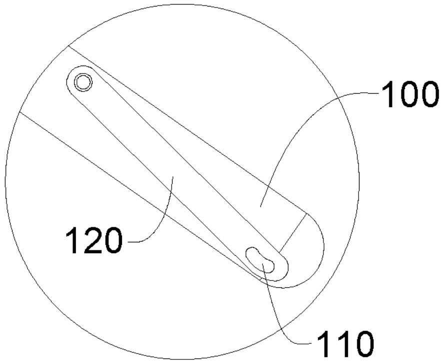
FIG. 4 is a partial enlarged view of a first end of the first connecting rod disclosed in the examples of the present disclosure.
Figure 10:
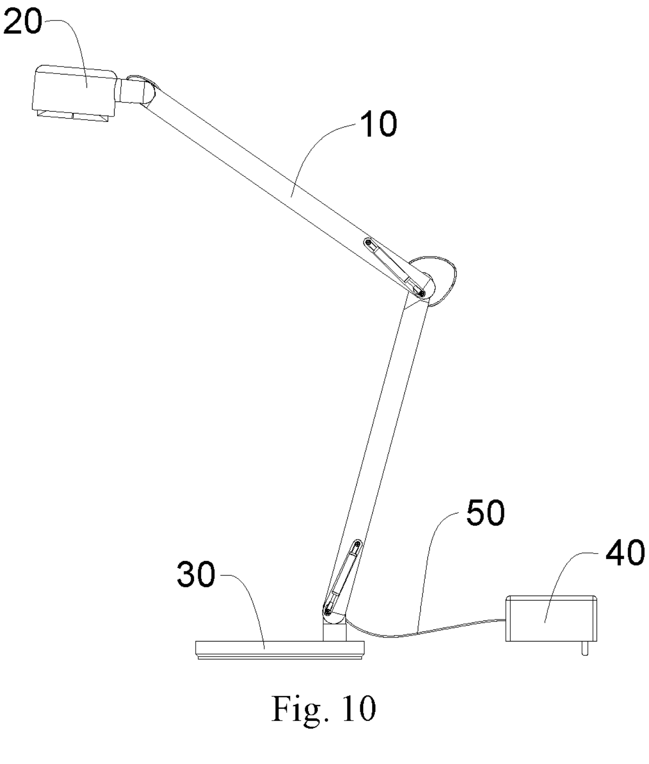
FIG. 10 is a schematic diagram of a first lighting lamp disclosed in the examples of the present disclosure.

Refer to FIGS. 1, 2 and 10, the example of the present disclosure discloses a lighting lamp, which includes a lamp cap 20 and a connecting rod assembly 10, and the connecting rod assembly 10 includes a first connecting rod 100, a second connecting rod 200 and a damper 300.

A first end of the second connecting rod 200 is rotatably connected with a first end of the first connecting rod 100, and a damper 300 is installed between the first connecting rod 100 and the second connecting rod 200. A first end of the damper 300 is connected with the first connecting rod 100, a second end of the damper 300 is connected with the second connecting rod 200, and the damper 300 may be connected with the first connecting rod 100 and the second connecting rod 200 by means of screws or pins.

Figure 9:
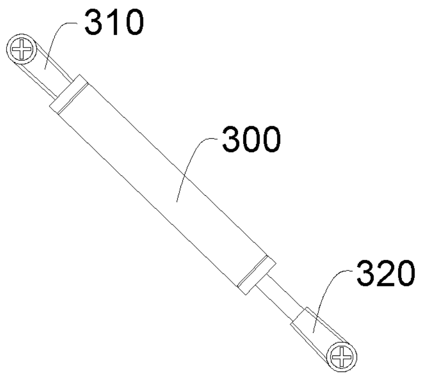
FIG. 9 is a schematic diagram of a damper disclosed in the examples of the present disclosure.

Referring to FIG. 9, in the present example, the first end of the damper 300 may be a fixed end 310, that is, the first end is fixedly connected with a main body, and the second end of the damper 300 may be set as a movable end 320, that is, the second end of the damper 300 can be telescopic relative to the main body.

The lamp cap 20 may be connected with any one of the first connecting rod 100 and the second connecting rod 200.

In the present example, the damper 300 may be a hydraulic damper 300 or a spring-damper 300.

The connecting rod assembly 10 of the lighting lamp disclosed in the present disclosure is provided with the damper 300 between the first connecting rod 100 and the second connecting rod 200. The damper 300 is a device that provides resistance to movement to reduce movement energy. The damper 300 is a device that can quickly stop the movable part of the instrument at a stable deflection position. The expansion and contraction life of the damper is up to 30,000 times, and its performance is stable, the movement is smooth and continuous, the stroke is adjustable, and the hand feels fine and smooth. Thus, the connecting rod assembly 10 provided by the present disclosure has the advantages of long service life, stable and smooth adjustment under the premise of ensuring simple structure and novel appearance. Especially in the large-angle adjustment, stable and smooth performance of the connecting rod assembly can still be maintained, which enables that the overall vibration of the lighting lamp is small and the operation of the lighting lamp is convenient during adjusting the position of the lamp cap 20.

In some implementations of the present example, after the damper 300 is installed between the first connecting rod 100 and the second connecting rod 200, in the case where the damper 300 reaches the maximum stroke, the first connecting rod 100 and the second connecting rod 200 cannot be rotated to be parallel to each other, so that the included angle between the first connecting rod 100 and the second connecting rod 200 can always be kept less than 180 degrees during the relative rotation between the first connecting rod 100 and the second connecting rod 200, so as to facilitate the adjustment, and the rotation stroke of the first connecting rod 100 and the second connecting rod 200 is restricted.

Referring to FIGS. 3 to 6, a first arc-shaped groove 110 may further be provided on one of the first connecting rod 100 and the second connecting rod 200, and the first arc-shaped groove 110 is arranged around a rotation axis of the first connecting rod 100. In addition, distances between respective positions of the first arc-shaped groove 110 and the rotation axis of the first connecting rod 100 are equal, the first arc-shaped groove 110 penetrates the first connecting rod 100 along the direction of the rotation axis of the first connecting rod 100. The screw or pin on the movable end 320 of the damper 300 may be inserted into the first arc-shaped groove 110, and the screw or pin on the movable end 320 can slide along the first arc-shaped groove 110. The length of the first arc-shaped groove 110 and the center angle corresponding to the first arc-shaped groove 110 can control the maximum angle of rotation between the first connecting rod 100 and the second connecting rod 200, and have the function of limiting the relative position of the first connecting rod 100 and the second connecting rod 200, and the angle between the first connecting rod 100 and the second connecting rod 200.

Figure 5:
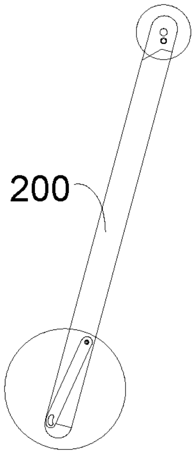
FIG. 5 is a schematic diagram of a second connecting rod disclosed in the examples of the present disclosure.
Figure 6:
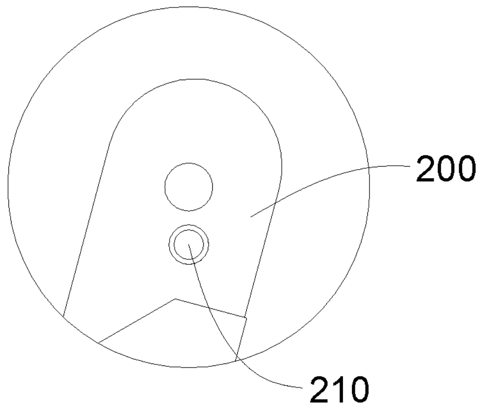
FIG. 6 is a partial enlarged view of a first end of the second connecting rod disclosed in the examples of the present disclosure.

Referring to FIGS. 5 and 6, further, a first block 210 may be provided on the other one of the first connecting rod 100 and the second connecting rod 200. In the present example, the first block 210 may be provided on the second connecting rod 200, and the first arc-shaped groove 110 is provided in the first connecting rod 100. The movable end 320 of the damper 300 may be connected with the first block 210, and the fixed end 310 of the damper 300 may be connected with the other one of the first link 100 and the second link 200 that is not provided with the first block 210. The arrangement of the first block 210 allows the damper 300 to be connected with the side wall of the first connecting rod 100 or the second connecting rod 200, and during the relative rotation of the first connecting rod 100 and the second connecting rod 200 to reduce the included angle, such an arrangement can prevent the damper 300 from being stuck between the first connecting rod 100 and the second connecting rod 200, thereby allowing the first connecting rod 100 and the second connecting rod 200 to rotate to a position with a smaller included angle.

The first block 210 is clamped in the first arc-shaped groove 110, and an end of the first block 210 away from the second connecting rod 200 extends to the other side of the first connecting rod 100, the damper 300 may be installed on a side of the first connecting rod 100 away from the second connecting rod 200, at this time, the movable end 320 of the damper 300 can be connected with the end of the first block 210 away from the second connecting rod 200. The first arc-shaped groove 110 may be arranged around the rotation axis of the first connecting rod 100, the first arc-shaped groove 110 has an arc shape, so that the first block 210 can slide along the first arc-shaped groove 110 in the case where the second connecting rod 200 rotates relative to the first connecting rod 100. The arrangement of the first arc-shaped groove 110 can make the damper 300 and the first connecting rod 100 be parallel, and at the same time, the damper 300 can expand and contract more smoothly, thereby facilitating the positioning of the first connecting rod 100 and the second connecting rod 200.

In addition, a first installation groove 120 may be provided on the first connecting rod 100. The first installation groove 120 is located on the side of the first connecting rod 100 away from the second connecting rod 200, and the first installation groove 120 is in communication with the first arc-shaped groove 110. The damper 300 may be installed in the first installation groove 120. After the damper 300 is installed in the first installation groove 120, it can be avoided that the damper 300 protrudes on the surface of the first connecting rod 100, thereby making the connecting rod assembly 10 more beautiful, and false touches to the damper 300 can also be avoided.

A length of the first installation groove 120 may be the same as a length of the damper 300 in the case where the damper 300 is extended to the longest. The first arc-shaped groove 110 with an arc shaped is completely located within the first installation groove 120. When the movable end 320 of the damper 300 slides along the first arc-shaped groove 110 with the first block 210, the damper 300 swings slightly, so a width of the first installation groove 120 may be slightly larger than a width of the damper 300, to accommodate the swing of the damper 300.

The first installation groove 120 may be arranged obliquely to the first connecting rod 100, while ensuring that the first installation groove 120 can fully accommodate the first arc-shaped groove 110, two ends of the first installation groove 120 are respectively extended to be close to two sides of the first connecting rod 100 in the length direction.

The above mentioned is only the solution in which the first block 210 is arranged on the second connecting rod 200, and the first arc-shaped groove 110 is arranged on the first connecting rod 100. In some other examples, it is possible to set the first block 210 on the first connecting rod 100, and set the first arc-shaped groove 110 in the second connecting rod 200, correspondingly, the first installation groove 120 needs to be also provided on the second connecting rod 200.

In some implementations of the present example, the connecting rod assembly 10 may include a plurality of dampers 300, and the connecting rod assembly 10 may further include a third connecting rod 400. A first end of the third connecting rod 400 may be rotationally connected with a second end of the second connecting rod 200, and a rotation axis of the third connecting rod 400 may be parallel to the rotation axis of the first connecting rod 100, and the damper 300 may be provided between the third connecting rod 400 and the second connecting rod 200.

Figure 7:
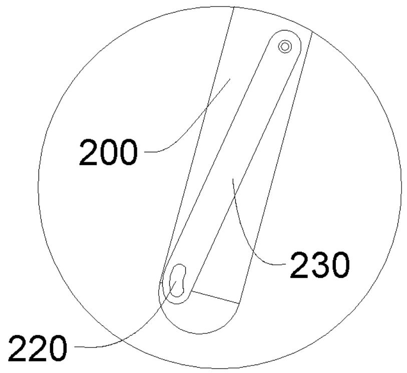
FIG. 7 is a partial enlarged view of a second end of the second connecting rod disclosed in the examples of the present disclosure.
Figure 8:
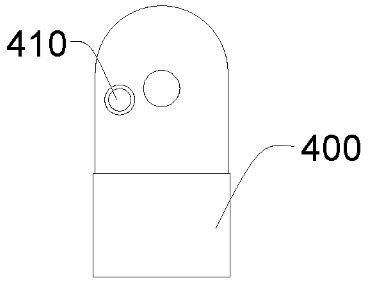
FIG. 8 is a schematic diagram of a third connecting rod disclosed in the examples of the present disclosure.

Referring to FIGS. 5, 7 and 8, in the same way as the connection mode between the second connecting rod 200 and the first connecting rod 100, the third connecting rod 400 and the second connecting rod 200 may be connected through the cooperation of the second block 410 and the second arc-shaped groove 220. In the present example, the second block 410 may be located on the third connecting rod 400, and the second arc-shaped groove 220 may be located on the second connecting rod 200. Similarly, the second arc-shaped groove 220 may penetrate the second connecting rod 200 along the direction of the rotation axis of the second connecting rod 200.

The second block 410 is clamped in the second arc-shaped groove 220, and an end of the second block 410 away from the third connecting rod 400 extends to the other side of the second connecting rod 200, the damper 300 may be installed on a side of the second connecting rod 200 away from the third connecting rod 400, at this time, the movable end 320 of the damper 300 can be connected with the end of the second block 410 away from the third connecting rod 400. The second arc-shaped groove 220 may be arranged around the rotation axis of the second connecting rod 200, the second arc-shaped groove 220 has an arc shape, so that the second block 410 can slide along the second arc-shaped groove 220 when the third connecting rod 400 rotates relative to the second connecting rod 200. The arrangement of the second arc-shaped groove 220 can make the damper 300 and the second connecting rod 200 be parallel, at the same time, the damper 300 can expand and contract more smoothly, thereby facilitating the positioning of the second connecting rod 200 and the third connecting rod 400.

In addition, a second installation groove 230 may be provided in the second connecting rod 200. The second installation groove 230 is located on a side of the second connecting rod 200 away from the third connecting rod 400, and the second installation groove 230 is in communication with the second arc-shaped groove 220. The damper 300 may be installed in the second installation groove 230. After the damper 300 is installed in the second installation groove 230, it can be avoided that the damper 300 protrudes on the surface of the second connecting rod 200, thereby making the connecting rod assembly 10 more beautiful, and false touches to the damper 300 can also be avoided.

A length of the second installation groove 230 may be the same as a length of the damper 300 in the case where the damper 300 is extended to the longest. The second arc-shaped groove with an arc shaped is completely located in the second installation groove 230. During the movable end 320 of the damper 300 slides along the second arc-shaped groove 220 with the second block 410, the damper 300 swings slightly, so a width of the second installation groove 230 may be slightly larger than a width of the damper 300, to accommodate the swing of the damper 300.

The second installation groove 230 may be arranged obliquely to the second connecting rod 200, while ensuring that the second installation groove 230 can fully accommodate the second arc-shaped groove 220, two ends of the second installation groove 230 are respectively extended to be close to two sides of the second connecting rod 200 in the length direction.

The above mentioned is only the solution in which the second block 410 is arranged on the third connecting rod 400, and the second arc-shaped groove 220 is arranged on the second connecting rod 200. In some other examples, it is possible to dispose the second block 410 on the second connecting rod 200, and dispose the second arc-shaped groove 220 on the third connecting rod 400, correspondingly, the second installation groove 230 needs to be also provided on the third connecting rod 400.

After the damper 300 is installed between the second connecting rod 200 and the third connecting rod 400, when the damper 300 reaches the maximum stroke, the second connecting rod 200 and the third connecting rod 400 cannot be rotated to be parallel to each other, so that the included angle between the second connecting rod 200 and the third connecting rod 400 can always be kept less than 180 degrees during the relative rotation between the second connecting rod 200 and the third connecting rod 400. It is possible to make the angle between the second connecting rod 200 and the third connecting rod 400, and the angle between the second connecting rod 200 and the first connecting rod 100 be located on both sides of the second connecting rod 200, respectively, thereby the connecting rod assembly 10 occupies a small space during the adjustment process.

In some implementations of the present example, the included angle between the first connecting rod 100 and the second connecting rod 200 may be less than 90 degrees, and the included angle between the second connecting rod 200 and the third connecting rod 400 may also be less than 90 degrees. The rotation angle between the first connecting rod 100 and the second connecting rod 200 may be adjusted and controlled according to the stroke of the damper 300, the length of the first arc-shaped groove 110, and the center angle corresponding to the first arc-shaped groove 110. The rotation angle between the second connecting rod 200 and the third connecting rod 400 may be adjusted and controlled according to the stroke of the damper 300, the length of the second arc-shaped groove 220, and the center angle corresponding to the second arc-shaped groove 220.

Specifically, the rotation angle between the first connecting rod 100 and the second connecting rod 200 may be controlled within 65 degrees, and the rotation angle between the second connecting rod 200 and the third connecting rod 400 may be controlled within 45 degrees.

In the present example, the cross-sectional shapes of the first connecting rod 100, the second connecting rod 200 and the third connecting rod 400 may be the same. Preferably, the cross-sections of the first connecting rod 100, the second connecting rod 200 and the third connecting rod 400 may all be square, round or oval.

In some implementations of this example, the connecting rod assembly 10 includes at least two second connecting rods 200, two adjacent second connecting rods 200 are rotatably connected, and the damper 300 is connected between the two adjacent second connecting rods 200.

Referring to FIGS. 5 to 7, one end of the second connecting rod 200 may be provided with a first block 210, and the other end of the second connecting rod 200 may be provided with a second arc-shaped groove 220. The first block 210 on one second connecting rod 200 in the two adjacent ones is clamped into the other second arc-shaped groove 220 in the two adjacent ones, and then the first block or the second arc-shaped groove 220 at the end of the second connecting rods 200 are respectively connected with the first connecting rod 100 and the third connecting rod 400.

In the case where two second connecting rods 200 are provided, there is an included angle between the two second connecting rods 200, the included angle between the second connecting rod 200 and the first connecting rod 100 and the included angle between the second connecting rod 200 and the third connecting rod 400 are both located on the other side of the included angle between the two second connecting rods 200.

In the case that three or more second connecting rods 200 are provided and the number of the second connecting rods 200 is an odd number, the plurality of second connecting rods 200 extend in "Z" shape. The included angle formed between the second connecting rod 200 and the first connecting rod 100 and the included angle formed between the second connecting rod 200 and the third connecting rod 400 should face opposite directions, so that the first connecting rod 100, the third connecting rod 400 and the odd number of second connecting rods 200 together form "Z" shape. In the case where the number of the second connecting rods 200 is an even number, the plurality of second connecting rods 200 extend in "Z" shape. The included angle formed between the second connecting rod 200 and the first connecting rod 100 and the included angle formed between the second connecting rod 200 and the third connecting rod 400 should face the same direction, so that the first connecting rod 100, the third connecting rod 400 and the even number of second connecting rods 200 together form "Z" shape.

Figure 11:
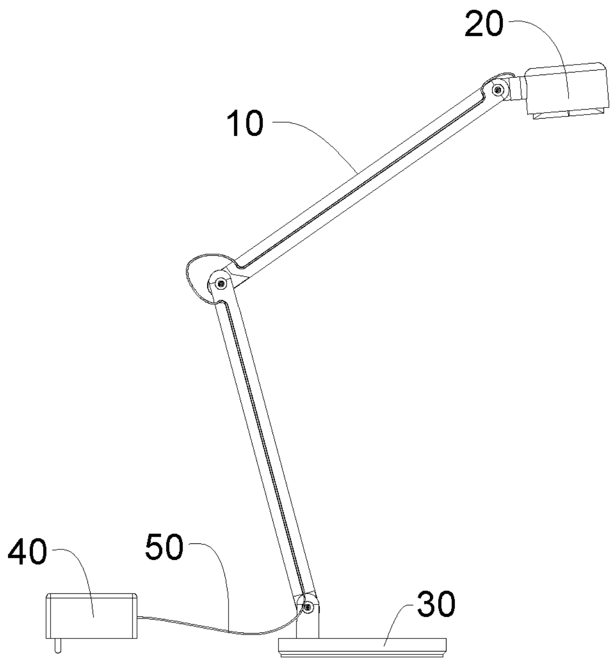
FIG. 11 is a rear view of the first lighting lamp disclosed in the examples of the present disclosure.

Referring to FIG. 11, the connecting rod assembly 10 may further be provided with a wire hole 500 for the wire 50 to pass through. The wire hole 500 sequentially passes through the third connecting rod 400, the second connecting rod 200 and the first connecting rod 100, and the wire 50 is located in the wire hole 500, one end of the wire 50 is electrically connected with the lamp cap 20, and the other end of the wire 50 is electrically connected with a power source 40.

Figure 12:
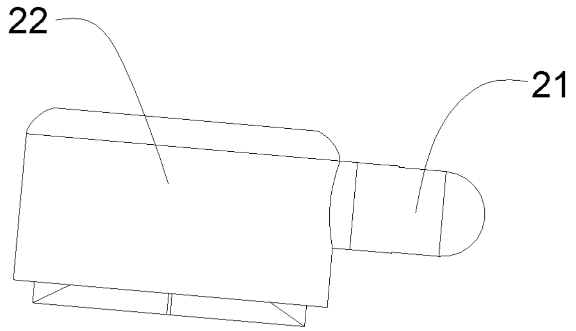
FIG. 12 is a schematic diagram of a lamp cap disclosed in the examples of the present disclosure.

Referring to FIG. 12, in some implementations of the present example, the lamp cap 20 includes a connecting portion 21 and a light source 22, the connecting portion 21 is rotatably connected with the second end of the first connecting rod 100. A rotation axis of the connecting portion 21 is parallel to the rotation axis of the first connecting rod 100, and the light source 22 is mounted on the connecting portion 21, the light source 22 may be located at an end of the connecting portion 21 away from the first connecting rod 100.

In which, the rotation angle between the connecting part 21 and the first connecting rod 100 may be controlled within 135 degrees, the connecting part 21 and the first connecting rod 100 may be fixed by bolts and nuts, and the nuts may be installed in the connecting portion 21, the bolt passes through the second end of the first connecting rod 100 and then is screwed to the nut. In the case where the angle between the connecting portion 21 and the first connecting rod 100 needs to be adjusted, loosen the bolt, and tighten the bolt to fixed connect the connecting portion 21 and the first connecting rod 100 after the adjustment is completed.

In some implementations of the present example, the lighting lamp may further include a connecting base 30. In the case where the connecting rod assembly 10 is not provided with the third connecting rod 400, the connecting base 30 may be rotatably connected with the second end of the second connecting rod 200, a rotation axis of the connecting base 30 is collinear with the axis of the second connecting rod 200. In the case where the connecting rod assembly 10 is provided with the third connecting rod 400, the connecting base 30 may be rotationally connected with the third connecting rod 400, and the rotation axis of the connecting base 30 is collinear with the axis of the third connecting rod 400 to facilitate the adjustment of the position of the lamp cap 20.

Figure 13:
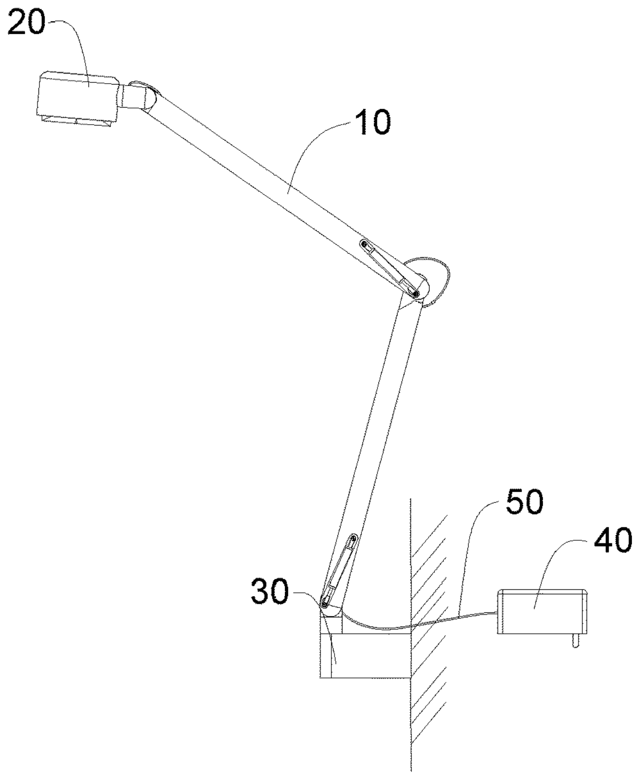
FIG. 13 is a schematic diagram of a second lighting lamp disclosed in the examples of the present disclosure.
Figure 14:
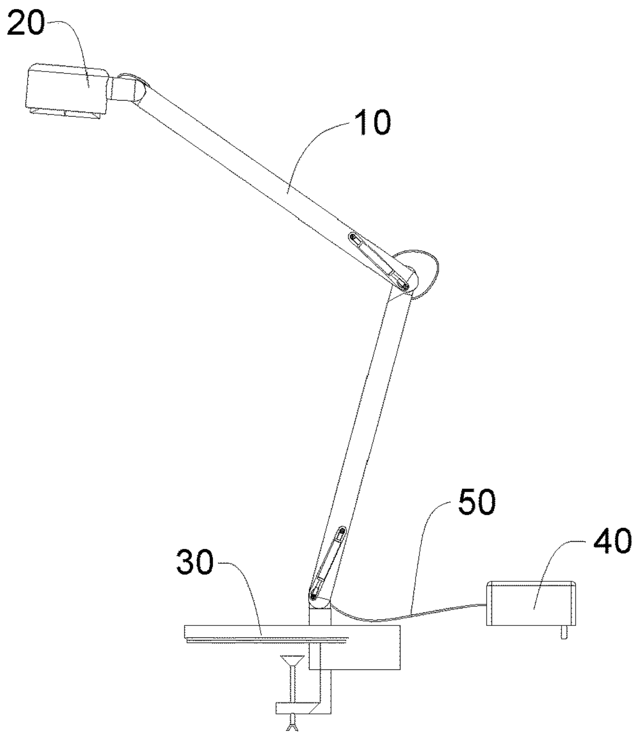
FIG. 14 is a schematic diagram of a third lighting lamp disclosed in the examples of the present disclosure.

In which, referring to FIGS. 13 and 14, the connecting base 30 may be as a chassis or a table clamp to conveniently install or apply the lighting lamp to different positions and scenes.

The lighting lamp described in the present example may be a desk lamp or a wall lamp or other lamps.

The technical solution adopted by the present disclosure can achieve the following beneficial effects:

The connecting rod assembly of the lighting lamp disclosed in the present invention is provided with the damper between the first connecting rod and the second connecting rod. The damper is a device that provides resistance to movement to reduce movement energy. The damper is a device that can quickly stop the movable part of the instrument at a stable deflection position, the expansion and contraction life of the damper is up to 30,000 times, and its performance is stable, the movement is smooth and continuous, the stroke is adjustable, and the hand feels fine and smooth. Thus, the connecting rod assembly provided by the present invention has the advantages of long service life, stable and smooth adjustment under the premise of ensuring simple structure and novel appearance. Especially in the large-angle adjustment, stable and smooth performance of the connecting rod assembly can still be maintained, which enables that the overall vibration of the lighting lamp is small and the operation of the lighting lamp is convenient during adjusting the position of the lamp cap. At the same time, the damper is simple in structure and low in unit price. In the case where the damper is used in lamps, it can shorten the installation time to reduce the cost, and improve the texture and aesthetic.

The above-mentioned examples of the present disclosure focus on the differences between the examples, and as long as the different optimization features between the examples are not contradictory, they can be combined to form a more optimal example. Considering the succinct writing, the details will not be repeated herein.

The above descriptions are only the examples of the present disclosure, and are not used to limit the present disclosure. For those skilled in the art, the present disclosure can have various modifications and changes. Any modification, equivalent replacement, improvement, etc. made within the spirit and principle of the present disclosure will be included in the scope of the claims of the present disclosure.

What is claimed is:

1. A lighting lamp, comprising:

a lamp cap; and a connecting rod assembly, wherein the connecting rod assembly comprises a first connecting rod, a second connecting rod and a damper; the direction of the axis of the second connecting rod is different from the direction of the axis of the first connecting rod; a first end of the second connecting rod is rotatably connected with a first end of the first connecting rod; the damper comprises a fixed end and a movable end, the movable end is slidably connected with the fixed end, and damping force is provided between the movable end and the fixed end; the fixed end is connected with one of the first connecting rod and the second connecting rod, and the movable end is connected with the other one of the first connecting rod and the second connecting rod; the damper is configured to expand and contract in a direction parallel to one of the first connecting rod and the second connecting rod, and different from the direction of the axis of the other one of the first connecting rod and the second connecting rod; the lamp cap is connected with the first connecting rod.

2. The lighting lamp according to claim 1, wherein one of the first connecting rod and the second connecting rod is provided with a first arc-shaped groove, and the first arc-shaped groove is arranged around a rotation axis of the first connecting rod, and the movable end is configured to slide along the first arc-shaped groove.

3. The lighting lamp according to claim 2, wherein the other one of the first connecting rod and the second connecting rod is provided with a first block, the first block is clamped to the first arc-shaped groove, and the first block is configured to slide along the first arc-shaped groove, the movable end is connected with the first block, and the fixed end is connected with the other one of the first link and the second link that is not provided with the first block.

4. The lighting lamp according to claim 3, wherein the first arc-shaped groove is disposed in the first connecting rod, the first connecting rod is provided with a first installation groove communicating with the first arc-shaped groove, and the damper is located in the first installation groove.

5. The lighting lamp according to claim 4, wherein a length of the first installation groove is equal to a length of the damper upon extending to the longest.

6. The lighting lamp according to claim 2, wherein the connecting rod assembly further comprises a third connecting rod, a first end of the third connecting rod is rotatably connected with a second end of the second connecting rod, the connecting rod assembly comprises at least two dampers, and the damper is connected between the third connecting rod and the second connecting rod.

7. The lighting lamp according to claim 6, wherein one of the second connecting rod and the third connecting rod is provided with a second arc-shaped groove, and the second arc-shaped groove is arranged around a rotation axis of the second connecting rod; the other one of the second connecting rod and the third connecting rod is provided with a second block, the second block is clamped to the second arc-shaped groove, and the second block is configured to slide along the second arc-shaped groove, the movable end is connected with the second block, and the fixed end is connected with the other one of the second link and the third link that is not provided with the second block.

8. The lighting lamp according to claim 7, wherein a central angle corresponding to the first arc-shaped groove is less than 90 degrees, a central angle corresponding to the second arc-shaped groove is less than 90 degrees, and the first connecting rod and the third connecting rod are respectively located on opposite sides of the second connecting rod.

9. The lighting lamp according to claim 6, wherein the connecting rod assembly comprises at least two second connecting rods, adjacent ones of the at least two second connecting rods are rotatably connected, and the damper is connected between the adjacent ones of the at least two second connecting rods.

10. The lighting lamp according to claim 6, wherein the connecting rod assembly is provided with a wire hole, the wire hole sequentially passes through the third connecting rod, the second connecting rod and the first connecting rod.

11. The lighting lamp according to claim 1, further comprising a connecting base, the connecting base is rotatably connected with a second end of the second connecting rod, and a rotation axis of the connecting base is collinear with an axis of the second connecting rod.

12. The lighting lamp according to claim 1, wherein the lamp cap comprises:

a connecting portion, which is rotatably connected with a second end of the first connecting rod, and a rotation axis of the connecting portion is parallel to a rotation axis of the first connecting rod; and a light source, which is installed on the connecting portion.

* * * * *